3,059,530
REDUCING CAMERAS
Josef Groak, London, England, assignor to Leslie Farrer-Brown, London, England, a British subject
Filed Oct. 5, 1959, Ser. No. 844,426
Claims priority, application Great Britain Oct. 24, 1958
3 Claims. (Cl. 88—24)

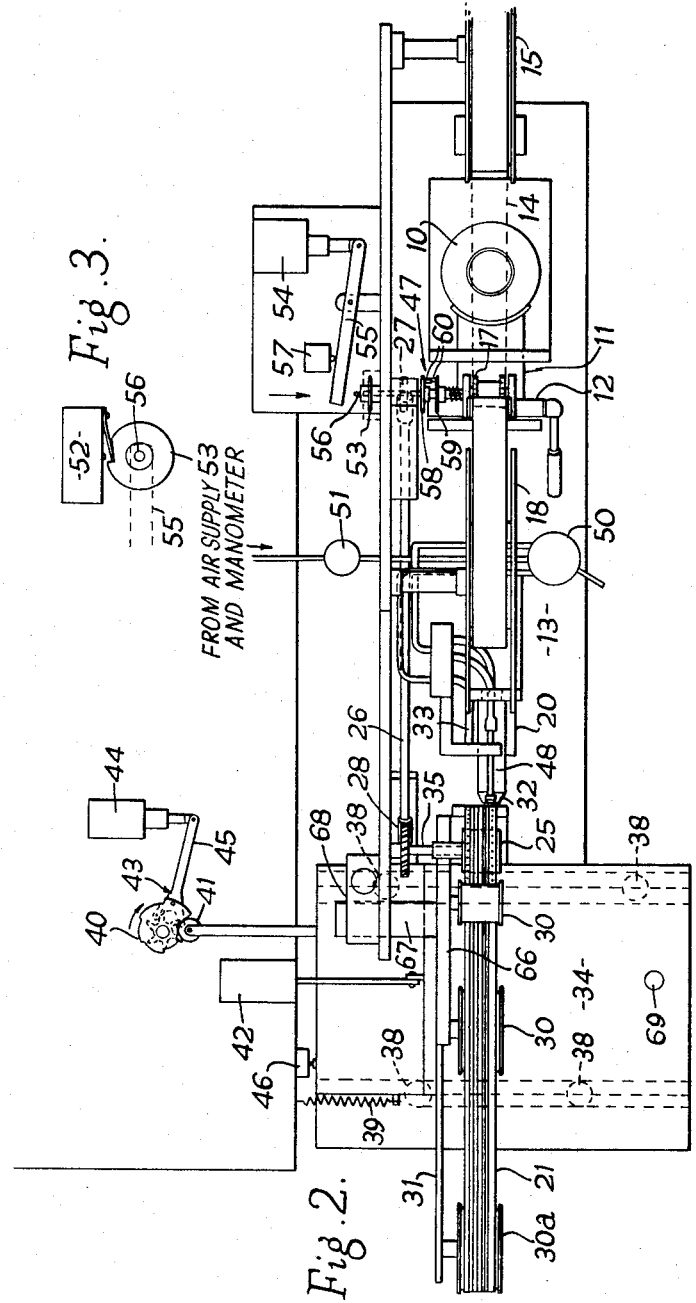

The present invention relates to reducing cameras.

The purpose of the camera according to the invention is to enable pictures of small dimensions to be produced in succession along a plurality of parallel tracks. This may be done with the object, for example, of producing micro-film records or motion picture records in which the parallel tracks form or are afterwards joined to form a single helical track on a loop of film base material.

To this end the camera according to the invention comprises means for supporting an original film record, means for supporting a length of unexposed film material and an optical system adapted to project an image of reduced size of a portion of the original record on to an area of the length of unexposed material and coupled driving means adapted to move the original film record and the length of unexposed material, the latter with a speed $1/n$th that of the former where $n$ is the factor by which reduction is effected, the means for supporting the length of unexposed film being movable transversely between a number of predetermined settings selectable by means of an adjustable stepped cam.

Thus in using the camera the transversely movable means are put in one setting and a first row of images is projected along the length of material. Another setting is then selected and a second row is projected adjacent the first. This process is repeated until all the required rows of images have been projected.

The motion of the original record and the unexposed length of material may be continuous, projection being through a slit, or intermittent projection being through a gate.

The various steps may be manually controlled or automatically controlled, for instance in the manner hereinafter described.

It is convenient to join the length of unexposed material end to end to form a loop which may be moved round, always in the same sense, the loop being moved sideways between the projection of successive rows by the transverse motion of its supporting means.

The invention will now be described by way of example with reference to the accompanying drawings, in which:

FIG. 2 is a schematic plan of the camera,

FIG. 3 is an enlarged fragmentary view in the direction of the arrow "A" in FIG. 2.

Figure 1:
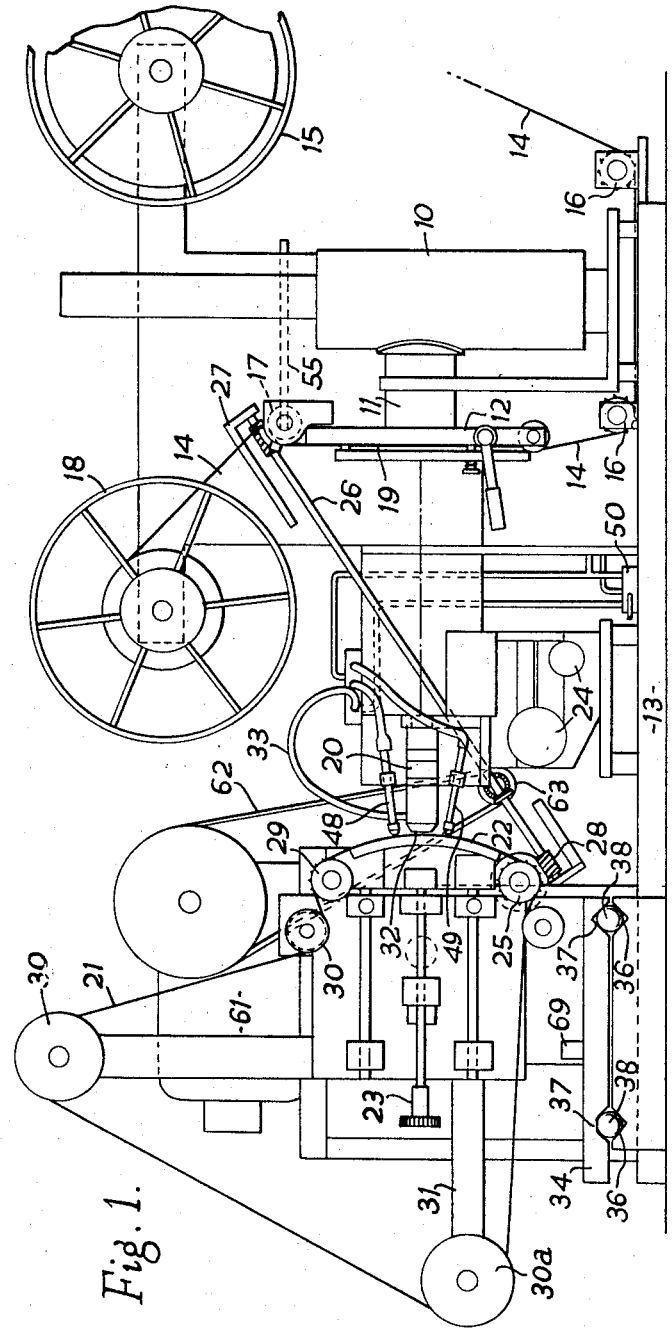
FIG. 1 is a schematic elevation of a reducing camera.

A projection lamp 10 and a condenser 11 are arranged to project light through a horizontal slit in a vertical plate 12 mounted at one end of a bed 13. A conventional 35 mm. film 14 passes from a take-off spool 15, round two freely rotatable sprockets 16 under the lamp, condenser and plate, up over the face of the plate 12, round a drive sprocket 17 and to a take-up spool 18. Torque is applied to the latter, for instance, through a slipping clutch or a tensioned cord (not shown) wound round its spindle is so that film is taken up from the drive sprocket. Springs 19 press the film lightly against the plate 12, holding it accurately in a given plane.

A low-powered microscope objective 20 is arranged, in the middle region of the bed 13, to throw a focussed image of the portion of the film over the slit on to a loop of unexposed 35 mm. film base 21 where it passes, under tension, over a curved plate 22. The image is of one-eighth the linear dimensions of the image on the original film and in order that this condition may be attained the curved plate 22 can be adjusted by a screw 23 and the objective can be adjusted by knobs 24 as to position along the length of the bed. Owing to the curvature of the plate 22 over which the unexposed film 21 passes portions of the film lying in different vertical positions are at different distances from the plane of the vertical plate. The slit in the vertical plate 12 is accordingly made as narrow as is necessary to ensure that the whole of the image of the portion of the film illuminated through the slit is in focus on the unexposed film. This matter depends upon the permissible depth of focus and the radius of curvature of the curved plate 22.

The loop of film 21 is driven round by a driven sprocket 25 at the bottom of the curved plate 22, the sense being such that film passes down over the curved plate, that is in the direction opposite to that in which the original film moves over the vertical plate 12. Both driven sprockets 17 and 25 are driven from a common shaft 26 through two reduction gears 27 and 28 at the two ends of the shaft, the gears being such that the unexposed loop moves with exactly one-eighth the speed of the original film. A motor 61 drives the shaft 26 through a belt 62 and bevel gears 63. The loop passes round a free sprocket 29 at the top of the curved plate and also round a number of supporting rollers 30. A lower one of the rollers (30a) is mounted on a pivoted arm 31 in such a way that the weight of this roller keeps the loop suitably tensioned.

Before any further description of the camera is given the means employed to set it up optically will be described. The curved plate 22 is fixed to a plate 66 having a heavy peg 67 clamped in a bracket 68 and can be dismounted and replaced by another similar plate (not shown) having a central aperture and a piece of film over the aperture. This other plate has attached to it a low powered microscope which is aligned along a radius on the concave side of the plate so as to be focused through the said aperture on to the piece of film over the aperture. This piece of film bears a graticule and another piece of film bearing a like graticule is placed over the slit in the vertical plate 12. The first mentioned graticule and the image of the second mentioned graticule are viewed through the microscope and the setting of the plate and the objective are adjusted until the image of the second mentioned graticule is focussed in the plane of the first mentioned graticule and is seen to be of one-eighth the dimensions of the second mentioned graticule by comparing its dimensions with those of the first mentioned graticule.

The objective 20 is then locked in position. The objective bears a hood 32 through which air can be blown from a supply of known pressure. The pressure in the line 33 feeding the hood is very sensitive to the spacing between the hood 32 and the film 21 on the curved plate. The pressure obtaining in the adjusted position is noted and the said other plate is removed nad replaced by the plate 22 used in normal operation. A loop of film is placed in position over this plate and the position of the plate is adjusted until the noted pressure is again obtained. The curved plate 22 is then locked in position and the camera is known to be correctly set up optically. The focussing can of course be checked periodically by means of the air system.

In operation the original film 14 and the loop of film 21 are set in action and exposure takes place continuously, a row of picture frames being exposed along one edge of the loop 21. When the first row has been completed the whole of the mechanism bearing the loop is displaced sideways in order that a second row adjacent the first may be exposed. In order to achieve this the said mechanism is mounted on a heavy subsidiary bed 34 slidable transversely on the main bed 13 and the drive for the driving sprocket for the loop is by way of a keyed shaft 35.

Two V-shaped ways 36 are machined across the main bed and a corresponding pair of ways 37 are machined across the bottom of the subsidiary bed. Ball bearings 38 are placed in the ways between the two beds, one of the ways of the subsidiary bed having a flat bottom so that the ball bearings in this way contact only one surface. In this way the principles of kinematic design are adhered to.

The subsidiary bed is biased in one direction by means of a spring 39 and the setting it assumes under this bias is determined by a cam 40 against which a cam follower 41 on the bed bears. The cam is in the form of a flat plate having six arcuate portions of equal arcuate extent and all centered on the axis of the cam but of different radii. Operation is started with the cam follower bearing on the arcuate portion of greatest radius, the bed 34 being drawn back against the action of the spring 39 by means of a peg 69.

When the first row of frames has been exposed the cam is rotated by 60° to bring the arcuate portion of second greatest radius opposite the cam follower which is brought up to the said portion by the spring. The motion of the subsidiary bed is damped by means of an oil dash-pot 42 in order to prevent the cam follower striking the cam surfaces with any force.

Clockwise rotation (FIG. 2) of the cam is caused by means of a spring (not shown) and controlled by a solenoid-operated escapement 43 of conventional form which allows the cam to rotate 60° each time the solenoid 44 displaces and restores the escapement lever 45. When the rotation of the cam has taken place exposure is carried out along a second track adjacent the first. In like manner third, fourth and fifth rows are exposed. When the cam 40 rotates to bring the sixth portion opposite the cam follower the subsidiary bed 34 moves to a position where it operates a micro-switch 46 which switches the whole camera off.

In order to allow the transverse motions to take place the loop is moved round continuously, but possesses an inch or so of dead space on which tracks are not exposed. Whilst the dead space is passing through the region of exposure the original film's motion is interrupted by means of a clutch 47 in the spindle of the driven sprocket for the original record.

The various steps in the sequence of operation are controlled by means of two air jets 48 and 49, one above and one below the objective 20, which sense the presence of an additional patch of film base material stuck on to the loop in the dead space. A two-way tap 50 allows air to be fed either to the head 32 for checking focussing or to the two jets 48 and 49 for controlling automatic operation.

Figure 4:
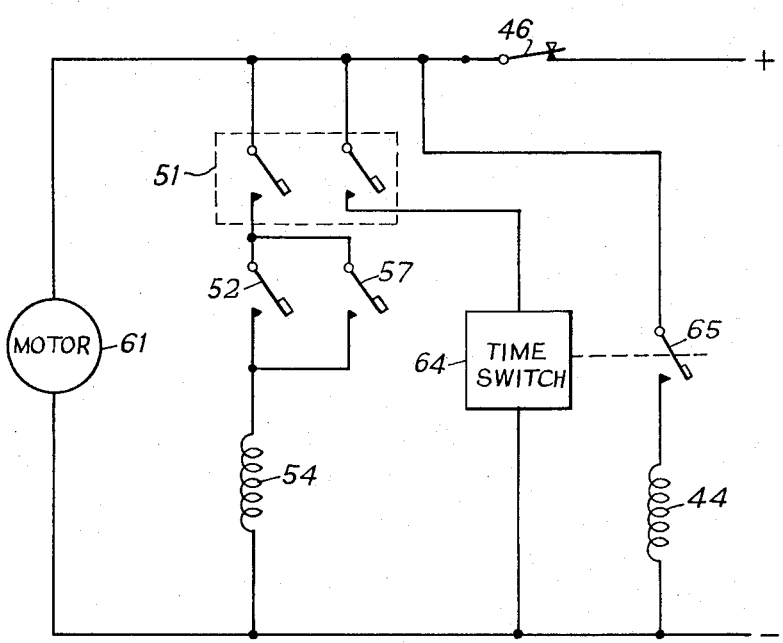
FIG. 4 is a circuit diagram of the camera control circuit.

When the patch passes under the upper jet 48 the pressure in its feed line is altered and an air switch 51 is operated by this means. The air switch has one set of contacts in series with a micro-switch 52 operated by a cam 53 once every revolution of the drive sprocket 17 for the original film. The first time that the micro-switch 52 is closed after the air switch 51 has been closed, a solenoid 54 is operated to disengage the clutch 47 in the drive to the sprocket for the original film by means of a clutch actuating lever 55 and a push rod 56. Another set of contacts of the air switch 51 are in series with a time switch 64 (FIG. 4) which, on closure of the said contacts, closes a switch 65 for a short interval of time. When the switch 65 is closed the solenoid 44 is energised. Thus the escapement lever 45 is withdrawn and, after a short time, released. Accordingly the subsidiary bed 34 moves to its next setting.

The patch passes on under the second jet 49, leaving the first jet. The solenoid 54 operating the clutch remains on by virtue of a "self-hold" switch 57 operated by the clutch lever 55. When the patch passes from the second jet the circuit to the clutch solenoid 54 is broken and the clutch 47 re-engages. Exposure of the next row takes place.

The camera is required to produce loops 21 which can, after cutting open and development, be rejoined to make another loop without any dead space, the joint being staggered in this case so that the five rows of picture frames join to form a single helical track. For this reason it is necessary that the rows of picture frames start and end accurately in the same positions, lengthwise of the loop of film. The air jets and air switch are not by themselves sensitive enough to do this with sufficient accuracy.

It is for this reason that the micro-switch in series with the air switch described above is employed. The air switch 51 selects the revolution of the drive sprocket for the original film in which the clutch is to be disengaged and the cam 56 operating the micro-switch 52 selects the point in the revolution at which the clutch 47 is disengaged. This gives an accurately determined end to the tracks. The beginning of the tracks is determined by the particular construction of clutch used. The clutch consists of two plates 58 and 59 each bearing one axially projecting peg 60. When the plates are together the peg 69 on the driving plate 58 butts up against the peg 60 on the other plate 59 and drives this plate. When the clutch is engaged, motion is not transmitted to the sprocket until the peg on the driving plate comes round to butt up against the other peg. Thus in this instance the air switch 51 selects the revolution in which the clutch is to be re-engaged and the construction of the clutch is such that the point in this revolution at which the sprocket starts to move is selected.

Many modifications can be made to the camera described. It is not necessary that operation be automatic and in this case the control system described can be dispensed with. If operation is automatic it is not necessary that the loop of film itself control the various steps. These may be programmed on to a master cam for example. If the loop of film is to be used methods of control other than those employing air jets can be used, A vacuum system or a system employing both vacuum and air pressure could be used in controlling the camera focussing and operating the various switches and solenoids to effect automatic operation. For instance black marks on the very edges of the loop can be used to influence photosensitive devices used to control the sequence of operations.

Continuous motion and projection through a slit need not necessarily be used. The camera can operate with intermittent motion and a gate in conventional manner.

In this case a "dead space" need not necessarily be provided. The motion of the loop and the original record can be arrested for as long as is required to perform the transverse motion whilst the shutter is closed.

Clearly the invention is not restricted to use with any particular type of film material and this latter term is accordingly intended to comprise any material in which chemical or physical changes can be produced by incident light and which changes can eventually be used to produce a visible picture. For example the term includes papers which can be given a differential electric charge corresponding from region to region of the surface to the light intensity in an image projected thereon and can thereafter be "developed" by powders attracted differentially on to the charged surface.

I claim:

1. A reducing camera for reproducing the frames of an original film record in succession along a plurality of rows side by side on a loop of film material, comprising; a longitudinal bed; means for supporting the original record at one end of said bed; an optical reducing system mounted on said bed at an intermediate position thereof; transverse ways at the other end of said bed; a subsidiary bed mounted on said transverse ways and slidable transversely of the first said bed; an arrangement of guides for supporting the loop of film material mounted on said subsidiary bed; means traversed by said loop of film material defining an image plane; means for projecting light successively through a portion of said original film record and said optical system to form an image of said portion at said defined image plane; means for adjusting said optical system lengthwise of the first said bed and means for adjusting said image plane defining means on said transverse bed lengthwise with respect to the first said bed to cause said image to be of predetermined reduced size and accurately in focus in said image plane; a common drive source; means coupling said common drive source to said loop of film material to impart continuous circulatory movement thereto through a plurality of complete circulations; disengageable means coupling said common drive source to said original film record; means for disengaging said disengageable means to arrest the motion of said original record once per complete circulation of said loop; and means for shifting said subsidiary bed by a like amount during each arresting of motion of said original record to define a successive one of said rows for each said complete circulation.

2. A reducing camera for reproducing the frames of an original film record in succession along a plurality of rows side by side on a loop of film material, comprising; a longitudinal bed; means for supporting the original record at one end of said bed; an optical reducing system mounted on said bed at an intermediate position thereof; transverse ways at the other end of said bed; a subsidiary bed mounted on said transverse ways and slidable transversely of the first said bed; an arrangement of guides for supporting the loop of film material mounted on said subsidiary bed; means traversed by said loop of film material defining an image plane; means for projecting light successively through a portion of said original film record and said optical system to form an image of said portion at said defined image plane; means for adjusting said optical system lengthwise of the first said bed and means for adjusting said image plane defining means on said transverse bed lengthwise with respect to the first said bed to cause said image to be of predetermined reduced size and accurately in focus in said image plane; a common drive source; means coupling said common drive source to said loop of film material to impart continuous circulatory movement thereto through a plurality of complete circulations; disengageable means coupling said common drive source to said original film record; means for disengaging said disengageable means to arrest the motion of said original record once per complete circulation of said loop; and means for shifting said subsidiary bed by a like amount during each arresting of motion of said original record to define a successive one of said rows for each said complete circulation; said disengageable means comprising a clutch the members of which are only in driving relationship with each other in one relative angular position thereof; said means for disengaging said disengageable means comprising an electromagnetic clutch-operating device and a circuit for energizing said device, said circuit comprising a cam-operated switch, a cam for operating said switch being coupled to said clutch, whereby said clutch is only disengaged at a particular angular setting thereof.

3. A reducing camera for reproducing the frames of an original film record in succession along a plurality of rows side by side on a loop of film material, comprising; a longitudinal bed; means for supporting the original record at one end of said bed; an optical reducing system mounted on said bed at an intermediate position thereof; transverse ways at the other end of said bed; a subsidiary bed mounted on said transverse ways and slidable transversely of the first said bed; an arrangement of guides for supporting the loop of film material mounted on said subsidiary bed; means traversed by said loop of film material defining an image plane; means for projecting light successively through a portion of said original film record and said optical system to form an image of said portion at said defined image plane; means for adjusting said optical system lengthwise of the first said bed and means for adjusting said image plane defining means on said transverse bed lengthwise with respect to the first said bed to cause said image to be of predetermined reduced size and accurately in focus in said image plane; a common drive source; means coupling said common drive source to said loop of film material to impart continuous circulatory movement thereto through a plurality of complete circulations; disengageable means coupling said common drive source to said original film record; means for disengaging said disengageable means to arrest the motion of said original record once per complete circulation of said loop; and means for shifting said subsidiary bed by a like amount during each arresting of motion of said original record to define a successive one of said rows for each said complete circulation; feed means for directing a jet of air on to said loop of film; an air switch responsive to changes of pressure in said feed means to detect a thickened portion of said loop; and a control circuit responsive to operation of said air switch to initiate operation of said means for shifting said subsidiary bed.

References Cited in the file of this patent

UNITED STATES PATENTS

| | | |
|---|---|---|
| 1,539,322 | Morton | May 26, 1925 |
| 1,673,217 | Walker | June 12, 1928 |
| 2,133,537 | Carpenter | Oct. 18, 1938 |
| 2,172,779 | Von Mihaly | Sept. 12, 1939 |
| 2,194,542 | Collins | Mar. 26, 1940 |

FOREIGN PATENTS

| | | |
|---|---|---|
| 673,571 | Germany | Mar. 24, 1939 |
| 510,308 | Italy | Jan. 21, 1955 |